United States Patent [19]

Heffner et al.

[11] Patent Number: 4,856,554

[45] Date of Patent: Aug. 15, 1989

[54] VACUUM CHECK VALVE AND METHOD OF CONTROL

[75] Inventors: Donald L. Heffner, Miamisburg; Dennis G. Merical, Casstown; David A. Homan, Centerville, all of Ohio

[73] Assignee: General Motors Corporation, Detroit, Mich.

[21] Appl. No.: 277,749

[22] Filed: Nov. 30, 1988

[51] Int. Cl.[4] .............................................. F16K 15/06
[52] U.S. Cl. .................................... 137/514; 137/526; 137/529; 137/542; 137/903
[58] Field of Search .................... 137/526, 529, 533.25, 137/542, 543, 903, 514

[56] References Cited

U.S. PATENT DOCUMENTS 4,557,290 12/1985 Chanal ............................ 137/529 X
4,643,221 2/1987 Parker ............................. 137/526 X Primary Examiner—Robert G. Nilson
Attorney, Agent, or Firm—Ernest E. Helms

[57] ABSTRACT

A high flow vacuum check valve incorporates a plurality of rubber dampening feet located on the sealing bead side of the valve poppet. The feet extend axially slightly beyond the sealing surface of the sealing bead so as to have an axial compression interference, the feet first engaging the valve seat as the valve poppet moves from its open position toward its closed position, and then compressing as the valve poppet continues its movement until the valve is fully closed with the sealing bead in full sealing engagement with the valve seat. This interference compression causes the feet to perform as rate changing springs so long as they are compressed to any extent, dampening axial movements of the valve poppet, and also act as stabilizing members on the valve poppet in the lateral plane. The feet may also be constructed with tiers which also contribute to the stability of the valve poppet.

3 Claims, 1 Drawing Sheet

INTAKE MANIFOLD VACUUM SOURCE

VACUUM CHECK VALVE AND METHOD OF CONTROL

Cross references to Related Patents and Applications

The invention is an improvement on the vacuum check valve of U.S. Pat. No. 4,628,959 entitled "Vacuum Check Valve", filed Aug. 30, 1985, issued Dec. 16, 1986 and assigned to the common assignee. It also relates to the inventions disclosed and claimed in U.S. Pat. No. 4,724,867, entitled "Vacuum Check Valve" and filed Sep. 19, 1986, issued Feb. 16, 1988; U.S. Pat. No. 4,763,689, entitled "Vacuum Check Valve" filed July 21, 1987, issued Aug. 16, 1988; and U.S. patent application Ser. No. 277,629 pending (Docket No. G-1390), entitled "Vacuum Check Valve" and filed on even date herewith, all of which are also assigned to the common assignee.

FIELD OF THE INVENTION

The invention relates to a vacuum check valve and more particularly to such a valve used in the vacuum supply line as a control for a vacuum suspended brake booster supply. The valve assembly embodying the invention herein disclosed and claimed inhibits pulsation of the valve member as the vacuum pressures change due to air flow pulsations occurring in the vacuum source, particularly when that source is the intake manifold of an internal combustion engine. When valve pulsations are inhibited, the generation of undesirable valve noises is also inhibited.

DESCRIPTION OF RELATED ART

Vacuum check valves of the type disclosed in U.S. Pat. No. 3,086,544, entitled "Check Valve" and issued Apr. 23, 1963, have been used with vacuum suspended power brake boosters for many years. The typical valve construction of this type has a valve element positioned in a valve chamber and made essentially of a washer and a rubber element. The valve is contained and guided within the chamber by the chamber side wall in relation to the outer periphery of the washer. A spring in the valve chamber urges the valve element toward engagement with an annular ridge which forms a valve seat around the point of entry of the inlet conduit into the valve chamber. Since air flow must pass around the valve when it is open, the guiding function of the chamber side wall permits some valve lateral movements so that the valve may not always be completely axially aligned with the valve seat. This minor misalignment presented no problem with small leaks that occasionally occurred when used with larger engines. However, as vehicle engines have been made smaller to achieve a higher fuel economy, less vacuum is available to operate various vehicle accessories than was the case with most vehicle engines when such check valves began to be used.

The improved vacuum check valve of U.S. Pat. No. 4,628,959 into which the invention is preferably incorporated as described and claimed herein is a guided poppet valve having a valve stem extending through valve housing guide means. The poppet valve is reinforced for improved sealability. The valve member seal which is engageable with the valve seat is made of a material which substantially eliminates cold weather sticking. It minimizes the formation of ice crystals between the valve seal and the valve seat so that leakage of air past the valve does not normally occur, even in extremely cold weather. The material is also of a type that has improved fuel resistance. By guiding the valve poppet with a valve stem located along the valve poppet axis, greater clearance is able to be maintained between outer periphery of the valve poppet and the adjacent inner wall of the valve housing, permitting much higher air flow rates which are subject to substantially less restriction to flow. At the same time, the valve is maintained in proper guided relation to the valve seat, assuring full circumferential section and sealing. This type of valve has now been accepted and is in production use with a large portion of the vacuum boosters made in the United States of America.

In the vacuum check valve of U.S. Pat. No. 4,763,689 noted above, the valve member is laterally biased by a resilient O-ring type spring element to cause a slight drag force to be exerted on the valve member which is sufficient to inhibit valve member pulsations while permitting proper valve operation. Other arrangements for inhibiting valve member pulsations by various side-loading means are disclosed in U.S. Pat. No. 4,724,867, also noted above.

SUMMARY OF THE INVENTION

The vacuum check valve and method of control herein disclosed and claimed is concerned with controlling the air flow about the valve disc and seal member forming the valve or poppet as that member moves toward and away from the valve seat so that response of the poppet to engine air flow pulsations, which under some conditions would otherwise excite the poppet and result in a vibration and noise problem, can be eliminated.

The improvement herein disclosed and claimed incorporates a plurality of rubber dampening feet located on the sealing bead side of the valve poppet. The feet extend axially slightly beyond the sealing surface of the sealing bead so as to have an axial compression interference as they first engage the valve seat as the valve poppet moves from its open position toward its closed position, and then are compressed as the valve poppet continues its movement until the valve is fully closed. This interference compression causes the feet to perform as rate changing springs so long as they are compressed to any extent, dampening axial movements of the valve poppet. They also act as stablilizing members on the valve poppet in the lateral plane. The feet may be constructed with tiers which also contribute to the stability of the valve poppet.

IN THE DRAWINGS

DESCRIPTION OF THE PREFERRED EMBODIMENTS

Figure 1:
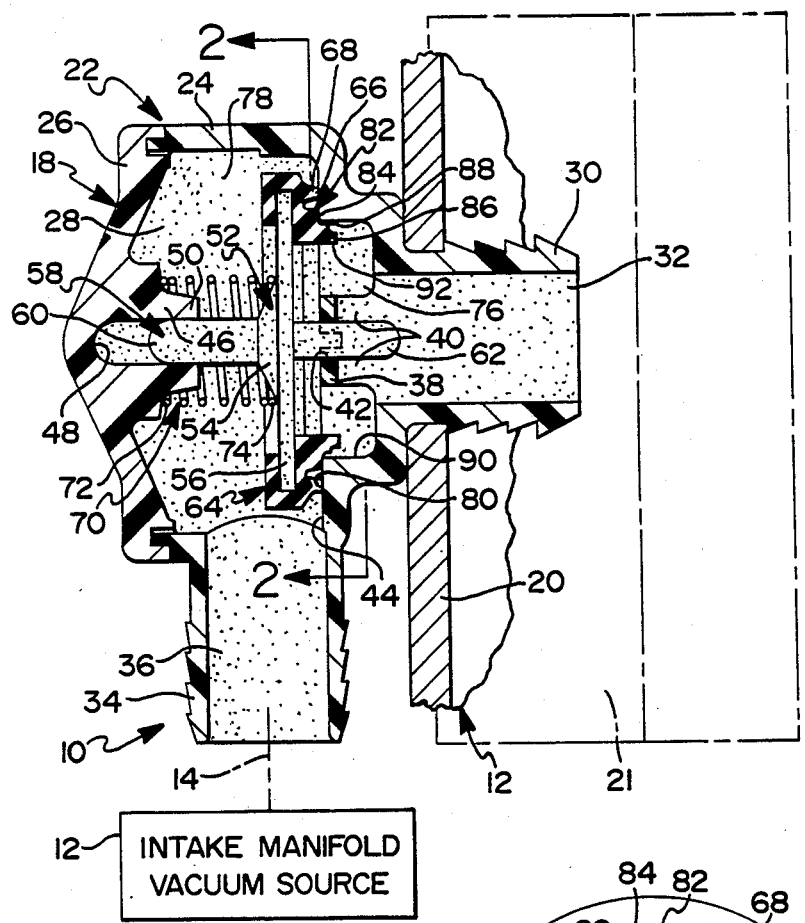
FIG. 1 is a section view of a preferred embodiment valve according to the present invention.

The system 10 shown in FIG. 1 includes a vacuum source 12 which is preferably an engine intake manifold. As is well known, the intake manifold of an internal combustion engine is commonly used as a source of vacuum to supply vacuum pressure to certain accessories, particularly in motor vehicles. A suitable connection 14 is provided to tap into the A vacuum suspended brake booster servomotor 16 may be the device with which a check valve embodying the invention is used, as more fully disclosed in the above noted patents. The servomotor has a vacuum check valve assembly 18 embodying the invention herein disclosed and claimed. Valve assembly 18 is preferably mounted on the servomotor housing front section 20 and is schematically illustrated in FIG. 1 as opening at the valve inlet side into the servomotor vacuum chamber 21. The outlet side of the vacuum check valve assembly 18 is connected by the vacuum connection 14 to the intake manifold vacuum source 12.

An example of a typical servomotor, with a more detailed description of its operation, is found in U.S. Pat. No. 3,249,021, issued May 3, 1966 and entitled "Power Brake Booster".

The vacuum check valve assembly 18 of FIG. 1 is a modification of the assembly disclosed and claimed in U.S. Pat. No. 4,628,959 noted above. A detailed descriptio of the valve assembly 18 follows so that the improvements to that valve assembly which are herein disclosed and claimed may be fully understood.

Valve assembly 18 includes a housing 22 formed of housing sections 24 and 26. Housing section 26 is sealingly secured to housing section 24 somewhat like a cover and cooperates with housing section 24 to define a valve chamber 28. An inlet 30 is integrally formed with housing section 24. The inlet is constructed to also provide means to secure the valve assembly to the booster housing front section 20 through a booster housing front section opening in sealing relation, as is well known in the art. It also has an inlet passage 32 formed therethrough.

An outlet 34 is also formed as a part of housing section 24. It has an outlet passage 36 formed therethrough and is arranged to receive vacuum connection 14 in sealing relation to provide communication between the valve outlet 34 and the vacuum source 22. The inlet and outlet passages 32 and 36 each connect with the valve chamber 28.

Housing section 24 also has a web 38 formed therein over the inlet passage 32, the web being provided with web openings 40 which provide a substantially unrestricted fluid flow connection from the inlet passage 32 into the valve chamber 28. Web 38 has a center part which is in axial alignment with the inlet passage 32. An opening 42 is formed axially through the web center part so that the web center part forms a guide for the valve member to be described.

An annular valve seat 44 is defined by a surface formed as a part of housing section 24 and generally defining an end wall of the valve chamber 28 together with web 38. The surface of web center part facing toward the main portion of the valve chamber 28 may be a planar extension of the surface defining the annular valve seat 44.

Valve housing section 26 is provided with a boss 46 extending into the valve chamber 28. Boss 46 has a recessed opening 48 formed therein and opening into the valve chamber 28. Opening 48 is in axially spaced alignment with the web opening 42. Boss 46 has a spring seat formed around its base and providing a spring seat for the valve spring to be described, as is more fully shown in the patents and patent applications noted above. The end 50 of boss 46 terminates in spaced relation to the web center part which has opening 42 formed therein. Recessed opening 48 also acts as a guide for a portion of the valve member to be described.

The check valve member 52 of FIG. 1 is a poppet type of check valve contained within the valve chamber 28. Valve member 52 has a rigid valve member body 54 formed to include a disc-like center section 56 and a valve stem 58. Valve stem 58 includes a first valve stem portion 60 extending axially from one side of the center section 56 and forming a first guided valve portion which is reciprocably received and guided by recessed opening 48 of housing section 26. The valve stem also includes a second valve stem portion 62 extending axially from the other side of the valve member center section 56 and forming a second guided valve portion. Valve stem portion 62 extends through the web opening 42 for guided reciprocal movement therein. One of the valve stem portions is larger in diameter than the other, and the same is true of the openings 42 and 48, thereby preventing the valve member 52 from being accidentally assembled in the axially reversed position from that desired. For this purpose it is preferred that the valve stem portion 62 and web opening 42 have a smaller diameter than that of the valve stem portion 60 and the recessed opening 48. Since the usual manner of assembly of the valve in the housing would be to first insert stem portion 62 through web opening 42, it is clear that the larger valve stem portion 60 could not be so inserted because web opening 42 is smaller in diameter than that valve stem portion. This effectively prevents misassembly of the valve member in the housing.

Valve member 52 has an annular valve member seal 64 secured to the peripheral portion of the disc-like center section 56 of the valve body 54 and extending radially therebeyond. One side of the annular valve member seal 64 has a valve seat-engageable surface 66 defined by the outer end of a circumferentially formed valve member bead 68 which extends axially from the main part of the valve member seal 64 so as to be engageable with the annular valve seat 44 of housing section 56. A compression coil valve spring 70 is received in valve chamber 28. It has one spring end 72 engaging the above described spring seat formed as a part of housing section 26. The other spring end 74 engages one side of the valve member body 54 so that the valve member 52 is continually urged toward surface sealing engagement with the annular valve seat 44. Valve spring 70 is so proportioned, and the axial distance between the end 50 of boss 46 relative to the facing surface of the valve member body 54 is such, that the valve member body may move against the force of the spring 70 to fully open the valve by separating the valve member bead 68 from the annular valve seat 44 a sufficient axial distance to provide substantially no flow restriction past the bead, the valve seat and the air flow control ring to be described. At the same time, valve stem portion 62 remains guided within the web opening 42 and valve stem portion 60 moves further into the recessed opening 48. The rigid valve member body 54 extends radially outward so that it is axially aligned with the major portion of the valve member bead 68 to provide reinforcement for the entire valve member seal 64 and axial stability for the valve member bead 68. The guiding actions of openings 42 and 48 on stem portions 62 and 60, respectively, further assure the maintenance of the sealing surface 66 of the valve member seal 64 in parallel planar relation with the valve seat 44 at all times.

When the valve member bead 68 is in sealing engagement with seat 44 as shown in FIG. 1, the valve chamber 28 is separated into a chamber inlet section 76 and a chamber outlet section 78. Chamber inlet section 76 is in fluid communication with the inlet passage 32 so that the entire surface area of the valve member 52 positioned radially inward of the seat engageable surface 66 is exposed to pressure within inlet passage 32 and therefore to the pressure in the vacuum chamber 22 of the booster 26. The chamber outlet section 78 is in full fluid communication with the outlet passage 36 at all times, and the pressure therein is the pressure being transmitted to the check valve assembly 16 from the engine vacuum source 12 through vacuum connection 14. This pressure also acts on the valve member 52 across the same effective surface as that described immediately above for the inlet pressure. It also acts on the small annular seal-engaging seat surface area 80 which is defined by the seat area throughout which valve member seal bead surface 66 is in surface engagement with the annular valve seat 44 when the valve is in the closed position. Therefore the pressure acting on valve member 52 and contained within chamber outlet section 78 acts over a slightly larger effective area than does the inlet pressure acting in the chamber inlet section 76 on the effective area of valve member 52. This difference in effective areas is maintained at a minimal amount by keeping the area of surface 80 to a minimal amount. Therefore the valve will remain closed so long as the absolute pressure acting in chamber 78 is greater than, or substantially equal to, the absolute pressure acting in chamber 76. Because the spring force exerted by spring 70 is light, the valve will be moved axially to its open position when the absolute pressure in chamber 76 only slightly exceeds the absolute pressure in chamber 78. The minimal contact area is also important in preventing the valve from sticking during extremely cold conditions, as will be further described.

The valve member seal 64 is preferably molded in place on the valve member body. It has been found that it is also preferable to make the valve member seals from a fluoro-silicone rubber for improved fuel vapor resistance and minimization of cold weather sticking. The material should have a durometer of about 40 to 50 at a standard temperature of 70° F., and should increase indurometer with a decrease in ambient temperature to no more than about 60 to 70 durometer at about minus 10° F. This will not only substantially eliminate cold weather sticking of the valve seal to the valve seat under cold weather conditions, but will also maintain good sealing characteristics throughout the range of temperatures normally encountered in vehicles, such a temperature range being from as high as about 280° F. in the engine compartment in which the valve is normally located to as low as about minus 40° F.

By arranging the valve member so that it is guided and supported axially, greater clearance around the outer periphery of the valve member in relation to the valve housing is permitted when the valve is fully open so to minimize flow restriction in that area. It is preferred that the annular area defined by the outer periphery of the valve member and the portion of the valve housing which is radially outward of the valve member outer periphery when the valve is fully open be at least as great as the effective cross-section area of the inlet port formed by inlet 62. This assures a substantially unrestricted air flow past the outer periphery of the valve member when the valve assembly is fully open. A considerably greater air flow may be obtained through the valve than has heretofore been the case. This therefore leads to an increase in the size of vacuum hose such as the hose providing the vacuum connection 24, as well as the sizes of the inlet passage 32 and the outlet passage 36, to take full advantage of the decrease in restriction to flow in the valve itself. This has resulted in substantially less pressure drop in relation to flow rate, minimizing the amount of time required to restablish the desired vacuum pressure in the vacuum chamber of the brake booster during or after booster operation. At the same time, the average differential pressure for opening the vacuum check valve is maintained at less than one inch of mercury. Where the average flow restriction at a flow rate of 500 cubic feet per hour of air through the valve has previously been in the range of about 18 to 28 inches of mercury, the valve shown in the FIGS. has an average flow restriction at this flow rate of less than 3 inches of mercury.

The valve has also minimized the amount of leakage when the valve is supposed to be fully closed. Valves like those disclosed in U.S. Pat. No. 4,628,959 (noted above) have been equal to the best of valves in current production at moderately high temperatures. For example, at 212° F., tests have indicated that no leakage has occurred, while on some production units using other valve designs, as much as 10% of the valves will have some leakage at this temperature.

The type of valve shown in the drawing has also considerably decreased the valve leakage at cold temperatures, as well as valve sticking under cold temperatures. For example, valves of the type illustrated in FIG. 1, including valves like those disclosed in U.S. Pat. No. 4,628,959, had no leaks and did not stick at 0° F. The valve also showed dramatic improvement in leakage and potential failure with a pressure differential thereacross as small as 2 inches of mercury and up to 20 inches of mercury, in comparison to various valves used by different manufacturers.

It has been found that in some installations the valve of U.S. Pat. No. 4,628,959, referred to above, would pulsate and generate disagreeable valve noises. Experience indicated that this has occurred when used with some engines but not with others. It involves the air flow pulsations set up in the intake manifold, particularly at certain engine speeds, and has been more noticeable with engines having fewer cylinders, e.g., four, than those with more cylinders, e.g., eight. It also appears to depend on other factors and conditions where such pulsations may sympathetically reinforce each other and operate at frequencies to which the valve member responds. While not being an adverse operational problem, the noises generated by the valve pulsations are objectionable.

As disclosed and claimed in certain of the other noted patents and applications, a side-load bias has been found to be helpful in preventing the valve from being excited by the engine air flow pulsations so that it also pulses.

In other instances, it is considered preferable to use no such side loading, but still provide means which will obviate the occurrence of undesirable pulsations of that type. One concept is to increase the flexibility of the disc and seal member at some point or annular area between the center of the disc and the valve member bead. This arrangement is the subject of the Application Ser. No. 277,629 pending (docket No. G-1390) noted above and filed on even date herewith. Another concept is to provide an initial restriction to air flow in the early stage of valve opening which will have a dampening effect on the occurrence of the undesirable pulsations. This concept also teaches the use of directed air flow during the early stage of valve opening to provide a side load effect on the valve by a venturi-generated pressure change area located at a preselected circumferentially positioned area between the valve member and the valve housing. This is disclosed and claimed in Application Ser. No. 277,628 pending (docket no. G-1692) entitled "Vacuum Check Valve and Method of Control" and filed on even date herewith.

This invention is directed to another arrangement for obviating the occurrence of undesirable valve pulsations and objectionable valve noises. This is accomplished by providing a plurality of circumferentially spaced dampening feet 82 incorporated into the valve member seal 64 on the valve member sealing bead 68 side. These feet act to dampen the valve member, which can be excited by engine intake manifold air flow pulsations to vibrate, primarily axially of the valve stem 58 but also at times to some extend circumferentially within the disc portion of the valve member. Such vibrations or pulsations create objectionable valve noises. Thus the feet, made of the same rubber material as the rest of the valve member seal 64, act in unison like a rate changing spring in the valve member axial direction and a stabilizing member in the lateral directions.

Therefore it is an object of the invention herein disclosed and claimed to inhibit undesirable valve pulsations and therefore inhibit the generation of undesirable valve noises which are the result of such pulsations by providing the aforementioned feet which act in unison as a rate changing spring and as a stabilizing member.

The improvement over the earlier noted vacuum check valve assemblies is found in the provision of the rubber feet 82. These feet are formed as integral parts of valve member seal 64, and are preferably located in circumferentially equi-spaced relation. In some instances it may be found to be preferable to provide other than equi-spaced feet for better damping characteristics. While a plurality of feet are required, it is usually sufficient to use three or four feet, although the invention is not so limited.

As best seen in FIG. 1, each of the feet 82 has a first end surface 84 which engages a small area of the annular valve seat 44 radially inward of the bead 68 and its seat surface 66. When the valve is closed and bead 68 is sealed against valve seat 44, these feet each have a slight rubber interference so that they are slightly compressed. This interference is preferably about 0.030 to 0.040 inch, so that the feet are compressed by that amount from the point at which they first touch valve seat 44 as the valve member is moving in the closing direction from an open position to the point at which they are so compressed and the bead 68 is sealed against valve seat 44. It can be appreciated that the feet 82 give axial stability to the valve member 52 at all times that they are under compression. They will also give lateral stability to the valve member.

Figure 2:
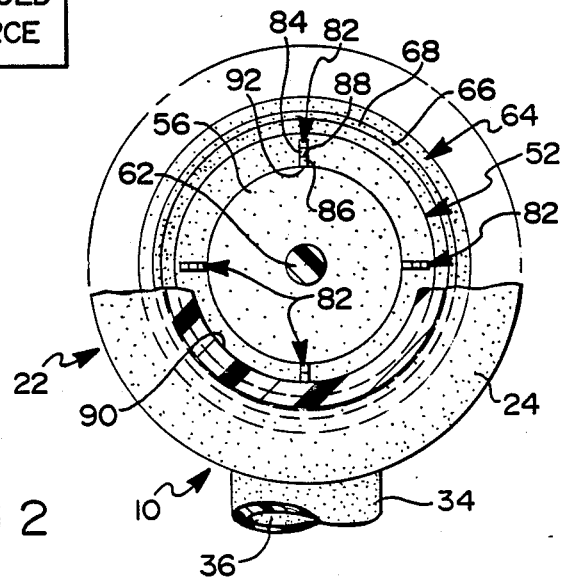
FIG. 2 is a view taken along line 2—2 of FIG. 1.

The feet 82 also have small axial extensions 86 which are shown as being formed in a tiered arrangement. These extensions are contained within the portion of the inlet valve chamber section 76 at all times that the valve seal 64 is axially near or engaged with the valve seat 44. The first tier 88 of each foot 82 is positioned radially inwardly if the side wall 90 of housing section 24 which is just below the valve seat 44, toward the inlet opening 32. Tier 88 is close to but spaced vary slightly away from side wall 90. Thus the tiers 88 of all of the feet 82 are so positioned that they are capable of touching the side wall 90 and have a damping action should for any reason the valve member and/or the guide opening 42 become worn sufficiently to permit such lateral movement of the valve member. It is often desired to have only the first tiers 88. If desired, second tiers 92 may be provided, and such tiers are shown in FIG. 1. The second tier 92 of each foot is positioned radially further inward than the first tier 88. Tiers 92 function as reserve dampeners, with the rubber masses of both sets of tiers assisting in controlling the distortion of the feet as they compress and expand, contributing to the parallel relation of the bead surface 66 with the seat surface 80 during all times that the feet are under any compression. FIG. 2 shows the feet as being circumferentially equi-spaced, with four feet being provided. It also shows the tiered arrangement of the feet, and the fact that the feet are relatively small so that they at no time form any restriction to air flow, such restriction being controlled by the axial spacing of the bead seal 68 relative to the valve seat 44.

The illustrated and claimed invention provides an arrangement which effectively inhibits valve pulsations when they are likely to occur because of pressure differential changes at either the inlet or outlet port or both, and therefore inhibit undesirable valve noises generated as a result of such pulsations.

The embodiments of the invention in which an exclusive property or privilege is claimed are defined as follows:

1. In a vacuum check valve assembly for a vacuum powered brake booster having:

a housing having a valve chamber formed therein, an inlet opening adapted to be connected to a vacuum powered brake booster, an outlet opening adapted to be connected to a source of vacuum pressure, and an annular valve seat surface in said valve chamber;

and a check valve in said valve chamber having a normal closed position preventing vacuum communication between said outlet opening and said inlet opening and an open position permitting vacuum communication between said outlet opening and said inlet opening;

said check valve having an axially guided disc including a disc body having a center and an annular rubberlike valve portion on the outer peripheral part of said disc body which has an annular bead seal, said bead seal having an annular valve seat-engagable surface for sealing said valve relative to said valve seat when said valve is in the closed position, said annular bead seal being axially spaced from said valve seat to permit air to flow therepast when said valve is in the open position;

the improvement comprising;

a plurality of circumferentially spaced feet formed on said rubberlike valve portion radially inward of said annular bead seal, said feet having valve engaging surfaces which extend axially beyond said annular bead seal so that said feet valve engaging surfaces engage said valve seat before said annular bead seal as said valve moved from the valve open position to the valve closed position, said feet being compressed axially by such valve movement to such an extent that said annular bead seal is in full annular sealing engagement with said valve surface and said valve is in the fully closed position, said feet during such compressive action performing as rate changing springs acting axially of said valve and as stabilizing members acting laterally of said valve.

2. The invention of claim 1 in which said feet are formed in axially extending tiers with one set of tiers being positioned radially inward of said annular valve seat immediately adjacent the inner side wall of a part of said housing, said tiers assisting in controlling distortion of said rubberlike valve portion and particularly said annular bead seal during all times that said feet are under compression.

3. The invention of claim 1 in which said feet are circumferentially equi-spaced, said feet having sufficient arcuate spaces therebetween to provide no restriction to air flow therepast at any time.

* * * * *